US006785450B2

(12) United States Patent
Wagman et al.

(10) Patent No.: US 6,785,450 B2
(45) Date of Patent: Aug. 31, 2004

(54) SELF-SUPPORTING FIBER OPTIC CABLE

(75) Inventors: Richard S. Wagman, Hickory, NC (US); Larry W Field, Hickory, NC (US); Michael J. Ott, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/383,468

(22) Filed: Mar. 7, 2003

(65) Prior Publication Data

US 2003/0165311 A1 Sep. 4, 2003

Related U.S. Application Data

(63) Continuation of application No. 09/579,555, filed on May 26, 2000, now Pat. No. 6,546,175.

(51) Int. Cl.[7] .............................................. G02B 6/44
(52) U.S. Cl. ...................................................... 385/100
(58) Field of Search ................................ 385/100, 109, 385/110, 113, 114; 174/41, 40 R, 70 A, 115; 94/41, 40 R, 30 A, 115

(56) References Cited

U.S. PATENT DOCUMENTS

| 3,074,107 A | 1/1963 | Kiyoshi Mase et al. |
| 3,532,783 A | 10/1970 | Pusey et al. ................. 264/135 |
| 4,188,088 A | 2/1980 | Andersen et al. ......... 350/96.23 |
| 4,763,983 A | 8/1988 | Keith ...................... 350/96.23 |
| 4,856,867 A | 8/1989 | Gaylin ..................... 350/96.23 |
| 4,921,413 A | 5/1990 | Blew .......................... 425/71 |
| 4,960,318 A | 10/1990 | Nilsson et al. ........... 350/96.23 |
| 5,095,176 A | 3/1992 | Harbrecht et al. ............. 174/23 |
| 5,136,683 A | 8/1992 | Aoki et al. .................. 385/141 |
| 5,180,890 A | 1/1993 | Pendergrass et al. ....... 174/117 |
| 5,189,718 A | 2/1993 | Barrett et al. ............... 385/101 |
| 5,371,823 A | 12/1994 | Barrett et al. ............... 385/101 |
| 5,789,701 A | 8/1998 | Wettengel et al. ............ 174/41 |
| 6,188,822 B1 | 2/2001 | McAlpine et al. .......... 385/100 |
| 6,229,944 B1 | 5/2001 | Yokokawa et al. ......... 385/114 |
| 6,249,628 B1 | 6/2001 | Rutterman et al. ......... 385/106 |

FOREIGN PATENT DOCUMENTS

GB          2169094 A        7/1986        ............ G02B/6/44

OTHER PUBLICATIONS

International Wire & cable Symposium Proceedings, "Development Of Optical Drop Wire And Drop Wire Stranded Cable", 1997. pp. 17–23.

*Primary Examiner*—Tulsidas C. Patel
(74) *Attorney, Agent, or Firm*—Timothy J. Aberle; Michael E. Carroll, Jr.

(57) ABSTRACT

A self-supporting fiber optic cable includes a messenger section having at least one strength and anti-buckling member enclosed within a jacket and a carrier section enclosed within a jacket that is joined to the jacket of the messenger section by a web. In a preferred embodiment of the present invention, carrier section does not include strength members and the optical fibers are set with a high EFL. The greater EFL accommodates elongation of carrier section without transmission of stress to optical fibers. In addition, the preferably generally cylindrical internal surface of a tube or jacket curves the optical fibers creating EFL, for example, the fibers are guided by the internal surface in a helical path. Resistance to carrier section elongation and contraction can be controlled by varying the length of the web connecting the carrier and messenger sections.

26 Claims, 1 Drawing Sheet

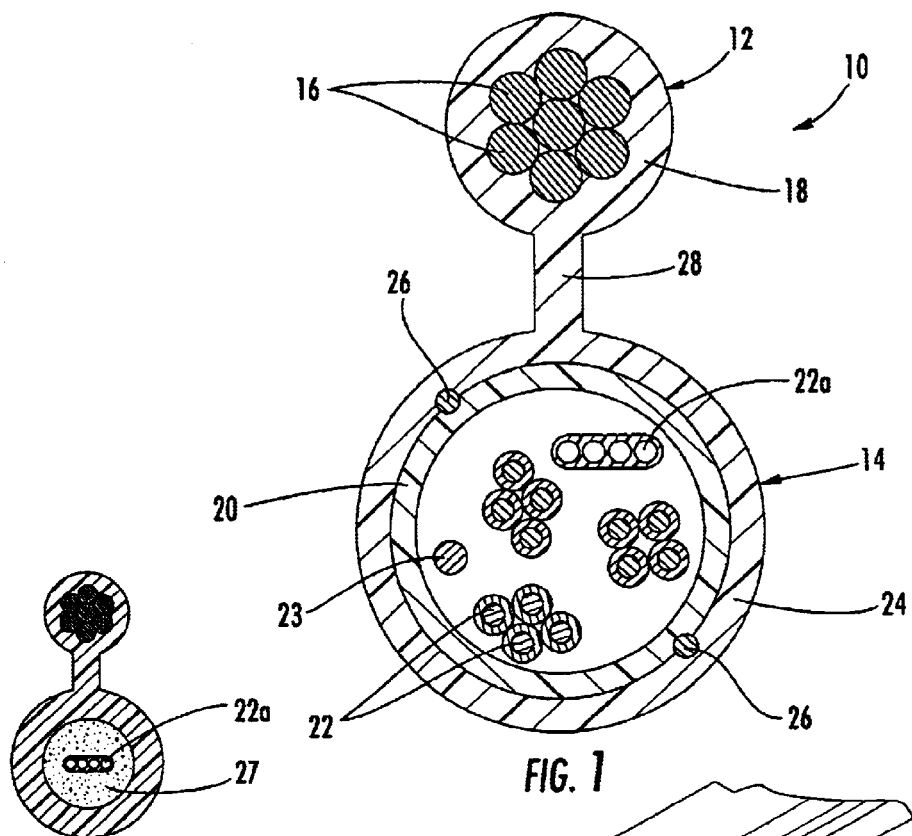
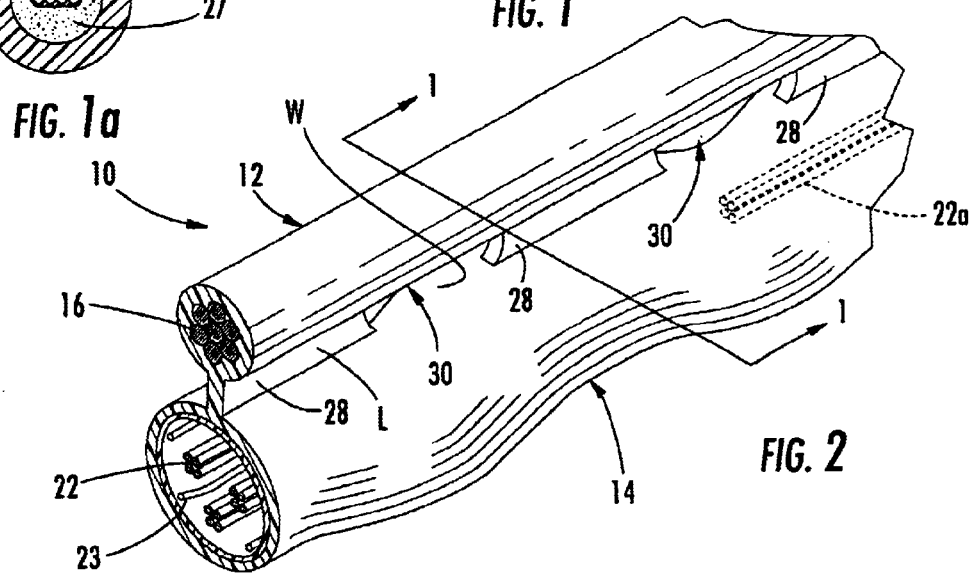

SELF-SUPPORTING FIBER OPTIC CABLE

RELATED APPLICATIONS

The present application is a Continuation of U.S. Ser. No. 09/579,555 filed on May 26, 2000 now U.S. Pat. No. 6,546,175 which is incorporated herein by reference.

FIELD OF THE INVENTION

The present invention relates generally to fiber optic cables and, more particularly, to self-supporting fiber optic cables.

BACKGROUND OF THE INVENTION

Fiber optic cables can be employed in a variety of applications including the transmission of voice, video, and data. Fiber optic cables can be installed either in conduits that are disposed within the ground, or aerially by being strung between utility poles or the like. Self-supporting fiber optic cables can include both optical fibers as well as strength members for providing mechanical support for the aerially installed cable.

Self-supporting fiber optic cables typically include a strength member in the form of a messenger section supporting the fiber optic cable, and a carrier section that includes optical fibers, or optical fibers and electrical conductors. One type of self-supporting fiber optic cable is a "figure 8" configuration. A "figure 8" self-supporting fiber optic cable includes a pair of cable sections connected by a web, wherein the messenger section forms one of the sections and the carrier section forms the other cable section. The web joining the messenger and carrier sections typically extends continuously along the length of the cable. Plastic components of a cable have a significantly greater coefficient of thermal expansion than the glass fibers. With changes in temperature, the plastic components may elongate or contract. The strength members in the messenger section help limit the amount of elongation and contraction that can take place by virtue of the connecting web that joins the carrier section to the messenger section.

The carrier section can have an overlength with respect to the messenger section. See, for example, U.S. Pat. Nos. 4,662,712 and 4,883,671, the contents of which are incorporated by reference herein.

In some field applications of figure 8 cables, the messenger and carrier sections are separated from each other over substantial lengths. For example, it may be desired to install the carrier section alone down the side of a utility pole to a repeater or other device. To accommodate such uses, figure 8 cables have required respective strength members in both the messenger carrier section.

SUMMARY OF THE INVENTION

One aspect of the present invention presents a fiber optic cable having a messenger section, the messenger section having at least one strength member and a jacket surrounding the strength member. The cable includes a carrier section, the carrier section being free of strength members and at least one optical fiber disposed therewithin, and a web connects the respective jackets of the messenger and the carrier sections.

Another aspect of the present invention presents a fiber optic cable having at least one optical fiber disposed within the jacket, the optical fiber being at least partially disposed along a path and having an EFL of about 0% to about 3.2% at unstressed room temperature conditions.

Another aspect of the present invention presents the combination of a carrier section not including a strength member, and the optical fiber being at least partially disposed along a curved path defined by a surface having an inside diameter between about 3.0 mm to about 13.0 mm, the optical fiber having an EFL of about 0.6% to about 3.2%. Cables according to the present invention can have connecting webs of varying lengths to control elongation of the carrier section.

Another aspect of the present invention presents a fiber optic cable having a messenger section, the messenger section having at least one strength member and a jacket surrounding the at least one strength member. A carrier section is connected to the messenger section by a series of webs, the webs having a general axial length L, with windows defined between the webs, the webs having a general axial length W, the L:W ratio preferably being about 1:1 to about 50:1. Alternatively, the L:W ratio can be about 0.25:1 to about 0.95:1.

BRIEF DESCRIPTION OF THE DRAWINGS

FIG. 1 is a cross-sectional view of a fiber optic cable according to one preferred embodiment of the present invention taken along line 1—1 of FIG. 2.

FIG. 1a is a cross-sectional view of a fiber optic cable having a filling compound disposed within the passageway of the jacket.

FIG. 2 is perspective view of the fiber optic cable of FIG. 1.

DETAILED DESCRIPTION OF THE INVENTION

Referring to FIGS. 1 and 2, a fiber optic cable 10 according to a preferred embodiment of the present invention is illustrated. Fiber optic cable 10 is a self-supporting cable that is particularly suitable for aerial applications. Fiber optic cable 10 preferably has a "figure 8" configuration. In this regard, fiber optic cable 10 preferably includes messenger and carrier sections 12, 14 that define respective portions of the "figure 8".

Messenger section 12 extends longitudinally and includes at least one and, more preferably, a plurality of strength members 16. For example, the carrier section can include a single metallic strength member 16, or more preferably a plurality of metallic wires, such as steel wires, that are helically wound or otherwise twisted together. However, the strength members can be non-metallic, including fiber-reinforced plastics such as glass reinforced plastic (GRP) or aramid reinforced plastic (ARP). The messenger section also includes a jacket 18, preferably formed of polyethylene, that surrounds strength members 16. As shown in FIGS. 1 and 2, the jacket has a preferably circular shape in lateral cross-section.

Carrier section 14 is connected to messenger section 12 as described below and also extends in a longitudinal direction. Carrier section 14 preferably does not include strength members. In the embodiment of FIGS. 1 and 2, the carrier section includes a core tube 20. Preferably, core tube 20 comprises a single tube that is centrally disposed within the carrier section. Core tube 20 is preferably formed of polypropylene, although the core tube can be formed of other materials.

Carrier section 14 also includes at least one and, more preferably, a plurality of optical fibers 22 disposed within core tube 20. Optical fibers 22 preferably include a silica-based core that is operative to transmit light and is surrounded by silica-based cladding having a lower index of refraction than the core. A soft primary coating surrounds the cladding, and a relatively rigid secondary coating surrounds the primary coating. Optical fibers 22 can be, for example, single-mode or multi-mode optical fibers made commercially available by Corning Incorporated. Optical fibers 22 can be arranged within core tube 20 in bundles as depicted in FIG. 1; alternatively, optical fibers 22 can be arranged in loose, unbundled form, or in optical ribbon form 22a.

In order to inhibit water migration in core tube 20, the carrier section can also include a water-blocking substance disposed within the core tube and around the optical fibers. For example, the water-blocking substance can be a water-swellable element 23 having a super-absorbent polymer, that can be incorporated into water-swellable yarns and/or water-swellable tapes; alternatively or additionally, a filling compound such as a hydrophobic grease or gel can fill core tube 20. If desired, carrier section 14 can include respective water-blocking tapes surrounding individual optical fibers, bundles, or optical ribbons, and/or a water-blocking tape can surround all optical fibers.

Carrier section 14 can also include a protective layer such as a corrugated armor tape (not shown) wrapped about core tube 20. Preferably, a waterblocking tape would be interposed between the armor tape and the jacket. Such an armor tape can significantly enhance the ruggedness of carrier section 14.

Carrier section 14 also includes a jacket 24 surrounding core tube 20. Preferably, the jacket of the carrier section is formed of the same material as the jacket of the messenger section, such as polyethylene. Although jacket 24 of carrier section 14 is illustrated as having a generally circular shape in FIGS. 1 and 2, jacket 24 can have a noncircular shape if desired.

Although not necessary for the practice of the present invention, carrier section 14 preferably includes one or more rip cords 26 (FIG. 1) therewithin between the tube and the jacket. By pulling the rip cords in both a radially outward and a longitudinal direction, the rip cords can sever core tube 20 and jacket 24 of the carrier section for accessing optical fibers 22.

Fiber optic cable 10 also includes a web 28 connecting messenger section 12 and carrier section 14. Typically, the web is formed of the same material that forms jackets 18,24 of the messenger and carrier sections, such as polyethylene. Preferably, web 28 comprises a plurality of intermittent web portions such that windows 30 are defined between adjacent web portions as depicted in FIG. 2. Windows 30 can be useful in that a tool can be inserted through a window 30 to sever web 28. The axial length L of a web portion 28 relative to an axial length W (FIG. 2) of window 30 can vary within the scope of the present invention. In other words, from the standpoint of resistance of carrier section 14 to elongation and contraction, it is preferred that length L is greater than or about equal to length W, such that the L:W ratio is about 1:1 to about 50:1. More preferably about the L:W ratio is about 1:1 to about 10:1. For example, window 30 can define about a 5 cm longitudinal gap about every half meter. The L:W ratio is selected so that carrier section 14 will be effectively restrained, through the webs, against elongation and contraction by messenger section 12. However, for less constraint on the messenger section, L is preferably less than W, e.g., the ratio is about 0.25:1 to about 0.95:1.

If desired, carrier section 14 can be made longer than messenger section 12 by some amount, such as about 0.2 percent. In this way, the carrier section can be substantially protected from the relatively high tensile forces to which fiber optic cable 10 may be subjected. Thus, in addition to excess fiber length (EFL) discussed hereinbelow, tensile forces acting on the cable can be controlled, thereby controlling optical attenuation. However, optical fibers 22 preferably have excess fiber length, and the excess fiber length can provide protection against fiber strain and optical attenuation.

In a preferred embodiment of the present invention, carrier section 14 does not include strength members and the optical fibers are set with a high EFL. The greater EFL accommodates elongation of carrier section 14 without transmission of stress to optical fibers 22, thereby rendering the strength members unnecessary. In addition, the preferably generally cylindrical internal surface of a tube or jacket curves the optical fibers creating EFL, for example, the fibers are guiding by the internal surface in a helical path. The diameter of a preferred helical path along which a given optical fiber 22 extends is increased by increasing the internal diameter (ID) of the tube or jacket surface. EFL is preferably measured by measuring the fiber and tube lengths, subtracting the tube length from the fiber length, and then dividing by the tube length. EFL is then expressed as a percentage.

The preferred EFL range, for a range of tube or jacket ID sizes, is about 0.0% to about 3.2%. More specifically, for ID sizes of about 3.0 mm to about 13.0 mm, preferred EFL ranges are about 0.6% to about 3.2%, more preferably about 0.6% to about 1.5%, and most preferably about 0.80% to about 1.0%. Depending on the number of fibers and the desired helix, the EFL ranges can vary according to the present invention. In other words, for example, the preferred EFL for a 12 fiber cable with IDs between 3.0 mm to 13.0 mm is between about 0.5% to about 3.2%. For a 72 fiber cable with tube IDs between about 3.0 mm to about 13.0 mm the EFL is preferably about 0.05% to about 2.5%. For a 144 fiber cable the EFL is preferably about 0.065% to about 2.1%, the tube ID range is about 5.0 to about 13.0 mm. However, it is contemplated that tube ID sizes can range up to about 18.0 mm or more.

Fiber optic cable 10 can include optical fibers 22 of different lengths. For instance, FIG. 2 illustrates one bundle of optical fibers 22a that terminate at a location spaced from the end of cable 10. It should be understood that FIG. 2 is schematic and not to scale. A plurality of progressively shorter lengths of optical fibers 22 can be employed so that, for instance, at regularly spaced locations along cable 10 there is at least one optical fiber 22 that terminates at each such location.

Fiber optic cable 10 of the present invention can be fabricated in various manners. In order to form carrier section 14, core tube 20, including optical fibers 22, ripcords 26, and any water-blocking elements that may be incorporated in carrier section 14, can be drawn from respective pay-offs. If desired, a water-blocking tape and/or a corrugated tape armor (not shown) can then be longitudinally wrapped about core tube 20. While carrier section 14 is being formed, at least one and, more preferably, a plurality of strength members 16 are drawn from respective pay-offs and stranded together in preparation for forming messenger section 12. The internal components of messenger section 12 and of carrier section 14 are then passed through an extruder that extrudes jackets 18, 24 that surround strength members 16 of messenger section 12 and core tube 20 of carrier section 14. In addition, the extruder forms web 28 that connect the messenger and carrier sections. Preferably, windows 30 are formed in web 28 such as by a plunger associated with the extruder, to define a plurality of intermittent web portions.

If it is desired to form carrier section 14 to have an overlength as a whole relative to messenger section 12, then messenger section 12 is generally placed under more tension than carrier section 14 during the manufacturing process. As described in detail in U.S. patent application Ser. No. 09/102,392, which is hereby incorporated herein by reference.

A suitable EFL manufacturing process is disclosed in U.S. Pat. No. 4,921,413, the disclosure of which is incorporated herein by reference.

Although fiber optic cable 10 includes core tube 20 containing the optical fibers, the invention is also applicable to cables 10' that do not include a core tube (FIG. 1a) such that the optical fibers are disposed in the passageway defined by the outer jacket 24 and are capable of contacting the inner surface of the jacket. The passageway of the jacket can include water-swellable elements and/or filling compounds 27 if desired. In this embodiment, the ripcords are preferably located in the jacket wall.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic cable, comprising:
a messenger section, said messenger section comprising at least one strength member and a jacket surrounding the at least one strength member;
a carrier section being a tubeless configuration that excludes a strength member, the carrier section including at least one optical fiber and at least one water-swellable element disposed within a passageway of a jacket of the carrier section; and
a web connecting said respective jackets of the messenger section and the carrier section, the web comprising a plurality of web portions spaced apart lengthwise along the fiber optic cable such that windows are defined in the web, a length L of the web portions being greater than a length W of the windows.

2. The fiber optic cable according to claim 1, the at least one optical fiber having an excess fiber length (EFL) greater than about 0.0 and less than about 3.2%.

3. The fiber optic cable according to claim 1, the at least one optical fiber being a portion of an optical fiber ribbon.

4. The fiber optic cable according: to claim 1, the at least one optical fiber being a portion selected from the group consisting of bundled optical fibers and loose optical fibers.

5. The fiber optic cable according to claim 1, the fiber optic cable being dielectric.

6. A fiber optic cable, comprising:
a messenger section, said messenger section comprising at least one strength member and a jacket surrounding the at least one strength member;
a carrier section being a tubeless configuration that excludes a strength member, the carrier section including at least one optical fiber and a thixotropic filling compound disposed within a passageway of the jacket; and
a web connecting said respective jackets of the messenger section and carrier section.

7. The fiber optic cable according to claim 6, the at least one optical fiber having an excess fiber length (EFL) greater than about 0.0 and less than about 3.2%.

8. The fiber optic cable according to claim 6, the at least one optical fiber being a portion of an optical fiber ribbon.

9. The fiber optic cable according to claim 6, the at least one optical fiber being a portion selected from the group consisting of bundled optical fibers and loose optical fibers.

10. The fiber optic cable according to claim 6, the fiber optic cable being dielectric.

11. The fiber optic cable according to claim 6, the web comprising a plurality of web portions spaced apart lengthwise along the fiber optic cable such that windows are defined in the web.

12. The fiber optic cable according to claim 11, a length L of the web portions being greater than a length W of the windows.

13. A fiber optic cable, comprising:
a messenger section, said messenger section comprising at least one strength member and a jacket surrounding the at least one strength member;
a carrier section excluding a strength member, the carrier section including at least one optical fiber disposed within a passageway of a carrier jacket, the at least one optical fiber having an excess fiber length (EFL) greater than about 0.6 and less than about 3.2%; and
a web connecting said respective jackets of the messenger section and carrier section.

14. The fiber optic cable according to claim 13, the carrier section further including at least one water-swellable element.

15. The fiber optic cable according to claim 13, the carrier section being a tubeless configuration.

16. The fiber optic cable according to claim 13, the carrier section further comprising a tube, the tube having the at least one optical fiber disposed therein.

17. The fiber optic cable according to claim 16, the tube having an armor tape disposed therearound.

18. The fiber optic cable according to claim 13, the at least one optical fiber being a portion of an optical fiber ribbon.

19. The fiber optic cable according to claim 13, the at least one optical fiber being a portion selected from the group consisting of bundled optical fibers and loose optical fibers.

20. The fiber optic cable according to claim 13, the fiber optic cable being dielectric.

21. The fiber optic cable according to claim 13, the web comprising a plurality of web portions spaced apart lengthwise along the fiber optic cable such that windows are defined in the web.

22. A fiber optic cable, comprising:
a messenger section, said messenger section comprising at least one strength member and a jacket surrounding the at least one strength member;
a carrier section excluding a strength member, the carrier section including at least one optical fiber disposed within a tube, an armor tape disposed about the tube, a water-swellable element disposed about the armor tape, and a jacket surrounding the armor tape, wherein the at least one optical fiber has an excess fiber length (EFL) greater than about 0.0 and less than about 3.2%; and
a web connecting said respective jackets of the messenger section and the carrier section.

23. The fiber optic cable according to claim 22, the at least one optical fiber being a portion of an optical fiber ribbon.

24. The fiber optic cable according to claim 22, the at least one optical fiber being a portion selected from the group consisting of bundled optical fibers and loose optical fibers.

25. The fiber optic cable according to claim 22, the fiber optic cable being dielectric.

26. The fiber optic cable according to claim 22, the web comprising a plurality of web portions spaced apart lengthwise along the fiber optic cable such that windows are defined in the web.

* * * * *